United States Patent [19]

Slagel

[11] Patent Number: 5,962,617
[45] Date of Patent: Oct. 5, 1999

[54] IMPACT RESISTANT POLYURETHANE AND METHOD OF MANUFACTURE THEREOF

[75] Inventor: Edwin C. Slagel, Avondale, Ariz.

[73] Assignee: Simula Inc., Phoenix, Ariz.

[21] Appl. No.: 08/595,262

[22] Filed: Feb. 1, 1996

Related U.S. Application Data

[63] Continuation-in-part of application No. 08/382,562, Feb. 2, 1995, abandoned.

[51] Int. Cl.[6] .................................................... C08G 18/02
[52] U.S. Cl. ................................ 528/61; 528/63; 528/64
[58] Field of Search ................................... 528/61, 63, 64

[56] References Cited

U.S. PATENT DOCUMENTS

| | | |
|---|---|---|
| 2,644,007 | 6/1953 | Irwin . |
| 2,680,127 | 6/1954 | Slocombe et al. . |
| 2,908,703 | 10/1959 | Latourette et al. . |
| 2,929,800 | 3/1960 | Hill, Jr. . |
| 3,127,855 | 4/1964 | Conlon . |
| 3,192,186 | 6/1965 | Muller . |
| 3,369,836 | 2/1968 | Haycock et al. . |
| 3,370,302 | 2/1968 | Karlyn . |
| 3,456,037 | 7/1969 | Hoeschele . |
| 3,600,358 | 8/1971 | Taub . |
| 3,620,905 | 11/1971 | Abramjian . |
| 3,755,262 | 8/1973 | Slagel . |
| 3,766,148 | 10/1973 | Taub . |
| 3,766,184 | 10/1973 | Taub . |
| 3,866,242 | 2/1975 | Slagel . |
| 3,963,681 | 6/1976 | Kaneko et al. . |
| 4,208,507 | 6/1980 | Stutz et al. ................................. 528/64 |
| 4,376,834 | 3/1983 | Goldwasser et al. . |
| 4,476,292 | 10/1984 | Ham et al. . |
| 4,808,690 | 2/1989 | Slagel . |
| 4,950,792 | 8/1990 | Altaus et al. ............................ 564/335 |

FOREIGN PATENT DOCUMENTS

| | | |
|---|---|---|
| 0 000 360 | 1/1979 | European Pat. Off. . |
| 0 220 641 | 1/1990 | European Pat. Off. . |

OTHER PUBLICATIONS

Young et al., "Polyesters from Lactones", Research Department, Carbide and Carbon Chemicals Company, Oct. 1959.

*Primary Examiner*—Jeffrey C. Mullis
*Attorney, Agent, or Firm*—Crowell & Moring LLP

[57] ABSTRACT

The present invention is an optically clear impact resistant polyurethane which provides exceptionally high heat distortion temperatures and excellent chemical resistance. The invention is particularly useful for transparency applications that require excellent impact resistance coupled with high heat distortion temperatures, such as glazings for buildings, vehicles, riot shields, aircraft canopies, and face masks.

85 Claims, No Drawings

IMPACT RESISTANT POLYURETHANE AND METHOD OF MANUFACTURE THEREOF

This is a CIP of application Ser. No. 08/382,562 filed Feb. 2, 1995, now abandoned.

BACKGROUND

1. Field of the Invention

The present invention relates to optically transparent heat and impact resistant polyurethane.

2. Background of the Invention

Currently, the standard material to which all optically transparent plastic materials are compared to for impact resistance is polycarbonate. These materials can be characterized by the temperature and pressure at which the material undergoes distortion. The heat distortion temperature of 9034 series clear polycarbonate is 280° F. at 264 psi.

Polycarbonate has a V-50 0.22 cal FSP (fragment simulating projectile) impacting rating of 925 ft./sec. This means that 50% of 22-caliber projectiles fired through a 0.250" polycarbonate sheet penetrate a 20 mils-thick 2024 T6 aluminum sheet (the "witness sheet") placed 6 inches behind the back surface of the poly carbonate sheet.

U.S. Pat. No. 3,866,242, which is incorporated herein by reference, discloses a polyurethane polymer protective shield. The polyurethane is produced by:

(a) reacting either a polyether glycol or a polyester glycol having a molecular weight of about 700 to 1,000 with methylenebis(cyclohexyl isocyanate) in an equivalent ratio of about three NCO to each hydroxyl to form a prepolymer, and (b) reacting the prepolymer with an aromatic amine curing agent having a methylene bridge between two aromatic rings, such as 4,4'-methylenebis(2-chloroaniline), in an equivalent ratio of 0.90 to 1.04 $NH_2/1.0$ NCO.

U.S. Pat. No. 4,808,690, which is incorporated by reference herein, discloses a transparent polyurethane polymer made from a polyol cured prepolymer. The prepolymer is made from a polyisocyanate and at least one multifunctional hydroxy-containing intermediate.

SUMMARY OF THE INVENTION

The optically clear polyurethane of this invention can be prepared by first producing a prepolymer by reacting one equivalent of a polyester glycol or a polyether glycol having a weight average molecular weight of between about 600 and about 1200 with 4,4'-methylenebis(cyclohexyl isocyanate) in an equivalent ratio of 2.5 to 4.5 NCO for each OH, with a preferable ratio of about 3 to 3.5 NCO for each OH. The prepolymer is then reacted with an aromatic diamine curing agent such as 4,4'-methylenebis(3-chloro-2,6-diethylaniline) in an equivalent ratio of 0.95 to 1.02 $NH_2/1.0$ NCO, with the preferred range being 0.96 to 1.0 $NH_2/1.0$ NCO.

The polyurethane of the present invention is particularly useful for transparency applications that require excellent impact resistance coupled with high heat distortion temperatures, such as glazings for buildings, vehicles, riot shields, aircraft canopies and face masks.

One object of this invention is to provide a method for producing optically transparent plastic sheets for use in applications requiring excellent impact resistance, excellent chemical resistance, and high heat distortion temperatures.

Another object of this invention is to provide transparent polyurethanes having excellent optical clarity, excellent ballistic properties, and high heat distortion temperatures compared to prior art materials.

These and other objects of the present invention are described in greater detail in the detailed description of the invention, the examples and the attached claims.

DETAILED DESCRIPTION OF THE INVENTION

The polyurethane of the present invention is prepared from aliphatic diisocyanates; OH-containing intermediates selected from polyester glycols, polyether glycols and mixtures thereof; and aromatic diamine curing agents. The following is a detailed description of each of these constituents:

OH-Containing Intermediates

The OH-containing intermediates which can be used to prepare the polyurethanes of this invention are polyether glycols and polyester glycols having a weight average molecular weight of between about 500 to about 1,200. Polyether glycols and polyester glycols having molecular weights of about 600 to 900 are especially effective. Polyether glycols that can be used include polytetramethylene ether glycols having a weight average molecular weight of between about 500 and about 1000.

Representative polyesters which can be used to prepare the compositions of this invention include polycaprolactones and polyesters based on esterification of dicarboxylic acids of four to ten carbon atoms, such as adipic, succinic and sebacic acids, in the presence of low molecular weight glycols of two to ten carbon atoms, such as ethylene glycol, propylene glycol, diethylene glycol, 1.4-butanediol, 1.6-hexanediol and 1,10-decanediol. The polycaprolactones are prepared by condensing caprolactone in the presence of difunctional active hydrogen compounds such as water or the low molecular weight glycols listed above. Polyesters obtained by esterification of caprolactones, dicarboxylic acids and glycols can be derived by well known esterification or transesterification procedures, as described, for example, in the article D. M. Young, F. Hostettler et al., "Polyesters from Lactone," Union Carbide F-40, p. 147. The preferred OH-containing intermediates are polyester glycols that are the esterification products of adipic acid or caprolactone with glycols of two to ten carbon atoms. The most preferred OH-containing intermediates are polyester glycols prepared from 1,6-hexanediol and adipic acid, 1,10-decanediol and adipic acid, or 1,10-decanediol and caprolactone.

Isoanates

The isocyanates which can be used to prepare the polyurethanes of this invention include diisocyanato-dicyclohexylmethanes and preferably isomeric mixtures thereof containing from about 20–100 percent of the trans, trans isomer of 4,4'-methylenebis(cyclohexyl isocyanate), hereinafter referred to as "PICM." Other components usually present in the mixtures of position and/or stereoisomers of the diisocyanato-dicyclohexylmethane used in this invention are the cis,trans and cis,cis isomers of PICM and stereoisomers of 2,4'-methylenebis(cyclohexyl isocyanate). These, as well as the trans,trans PICM isomer, are present in amounts which can be controlled by the procedures used to prepare the diisocyanato-dicyclohexylmethane. Preferred diisocyanates are isomeric PICM mixtures. An especially preferred mixture contains not less than about 50 percent of the trans,trans trans isomer and no more than about 20 percent of the cis,cis isomer of 4,4'-methylenebis (cyclohexyl isocyanate). This preferred mixture, when reacted with a polyester glycol and cured with 4,4'-methylenebis(3-chloro-2,6-diethylaniline) produces a high-quality impact-resistant, transparent polyurethane.

The PICM used in this invention is prepared by phosgenating the corresponding 4,4'-methylenebis(cyclohexyl amine) (PACM) by procedures well known in the art, as disclosed in, e.g., U.S. Pat. Nos. 2,644,007, 2,680,127, and 2,908,703, which are incorporated herein by reference. The PACM isomer mixtures, upon phosgenation, yield PICM in a liquid phase, a partially liquid phase, or a solid phase at room temperature. The PACM isomer mixtures can be obtained by the hydrogenation of methylenedianiline and/or by fractional crystallization of PACM isomer mixtures in the presence of water and alcohols such as methanol and ethanol.

Diamine Curing Agents

The aromatic diamine curing agents which can be used in the preparation of the polyurethanes of this invention have only primary amine groups. The preferred diamine curing agents have the following chemical formula:

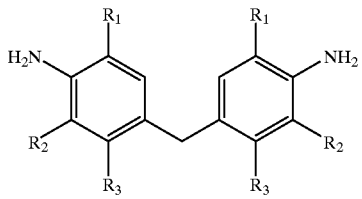

wherein $R_1$ and $R_2$ are each independently selected from methyl, ethyl, propyl, and isopropyl groups, and $R_3$ is selected from hydrogen and chlorine. Examples of the preferred diamine curing agents are the following compounds, manufactured by Lonza Ltd. (Basel, Switzerland):

LONZACURE® M-DIPA: $R_1=C_3H_7$; $R_2=C_3H_7$; $R_3=H$
LONZACURE® M-DMA: $R_1=CH_3$; $R_2=CH_3$; $R_3=H$
LONZACURE® M-MEA: $R_1=CH_3$; $R_2=C_2H_5$; $R_3=H$
LONZACURE® M-DEA: $R_1=C_2H_5$; $R_2=C_2H_5$; $R_3=H$
LONZACURE® M-MIPA: $R_1=CH_3$; $R_2=C_3H_7$; $R_3=H$
LONZACURE® M-CDEA: $R_1=C_2H_5$; $R_2=C_2H_5$; $R_3=Cl$ wherein $R_1$, $R_2$ and $R_3$ refer to the above chemical formula. Lonzacure® M-CDEA is available in the United States from Air Products and Chemical, Inc. (Allentown, Pa.). The preferred diamine curing agent is 4,4'-methylenebis(3-chloro-2,6-diethylaniline).

Preparation of the Invention

The polyurethanes of this invention can be prepared by one shot, quasi-prepolymer or full prepolymer methods, all of which are well known in the art. The preferred method of preparing the polyurethanes according to the invention is as follows: The methylenebis(cyclohexyl isocyanate) is first mixed with the OH-containing intermediate in an equivalent ratio of 2.5 to 4.5 NCO/1.0 OH and then heated to 190–275° F., preferably 260–275° F. The mixture is then heated under dry nitrogen so that the methylenebis(cyclohexyl isocyanate) reacts with the OH-containing intermediate to form a prepolymer. The heat source is then removed, the prepolymer is cooled to about 160° F., and the percent NCO in the prepolymer is determined. Additional methylenebis (cyclohexyl isocyanate) is then added to achieve an equivalent weight of from 415 to 425. The prepolymer is then reacted with the aromatic diamine curing agent in an equivalent ratio of 0.95 to 1.02 $NH_2/1.0$ NCO. The prepolymer is then cured at 240–275° F. for 4 to 16 hours. The curing time is longer for the lower temperatures and shorter for the higher temperatures.

Preferred prepolymers for use in the present invention are prepared from adipic acid/hexanediol polyester having a weight average molecular weight of about 1000 and 4-4'-methylenebis(cyclohexyl isocyanate) containing a minimum of 50% of the trans,trans isomer, and a maximum of 20% cis,cis isomer PICM. The equivalent ratio of NCO groups to OH groups is about three to one.

The polyurethane polymers of this invention can be cast, compression molded, extruded or injection molded. Casting is the preferred method, because it produces a polyurethane polymer with optimal optical characteristics.

The prepolymer may be cast in a mold prior to curing. The polyurethane material according to the invention may also be partially cured, by selecting an appropriate curing time and temperature, and then formed into the desired shape. Using this process, the polyurethane material can be formed into a simple or complex shape and then subsequently fully cured.

A triol may be added to the prepolymer in an amount sufficient to produce one percent cross-linking based upon equivalents of reactants, for example 4 to 8% by weight based on total reactants. Triols that are useful in the present invention include trimethylol ethane and trimethylol propane. The addition of a triol to the prepolymer increases the heat distortion temperature and improves the ballastics properties of the cured polyurethane.

The impact and crack propagation resistance of the polyurethanes according to the invention may be improved by the addition of an activated polybutene with epoxide functionality at one end in order to promote the formation of micro voids in the polyurethane. An activated polybutene may be added to the prepolymer in an amount ranging from 2.0 to 2.5% by weight based on the prepolymer without adversely affecting the desired optical and heat distortion properties. The addition of amounts greater than 2.5% by weight may result in a translucent or opaque polyurethane. Activated polybutenes that are useful in the present invention include compounds of the following formula:

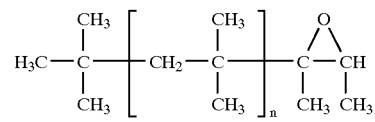

where n has a range of values such that the weight average molecular weight is about 365. One example of such an activated polybutene is Actipol E6, available from Elf Atochem.

Various anti-oxidants, ultraviolet stabilizers, and mold release agents may be used in the preparation of the polyurethanes of this invention. For example, one or more anti-oxidants may be added to the prepolymer in an amount of from 1 to 5% by weight based on total reactants. Anti-oxidants that are useful in the present invention include those of the multifunctional hindered phenol type. One example of a multifunctional hindered phenol type antioxidant is Irganox 1010, available from Ciba Geigy, which has the following chemical formula:

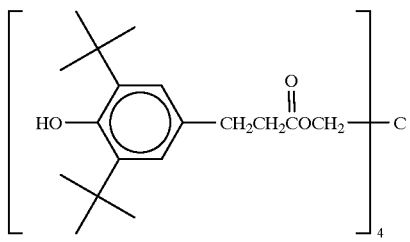

A UV-stabilizer may also be added to the prepolymer, either prior to or during the curing step, in an amount of from 1.5 to 2.0% by weight based on total reactants. UV-stabilizers that are useful in the present invention include benzotriazoles. Examples of benzotriazole UV-stabilizers include Cyasorb 5411 and Tinuvin 328. Cyasorb 5411, available from American Cyanamid, has the following chemical formula:

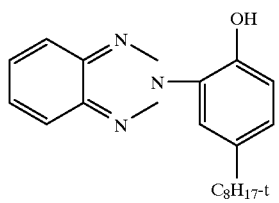

Tinuvin 328, available from Ciba Geigy, has the following chemical formula:

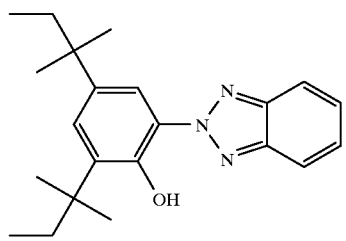

Another UV-stabilizer that may be used is Cyasorb 3604, available from American Cyanamid, which has the following chemical formula:

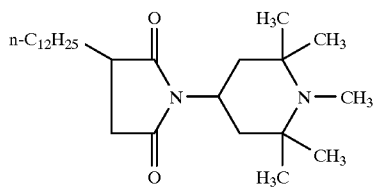

The polyurethanes of the present invention may be cast between glass plates, and the glass plates may be advantageously coated with a mold release agent prior to casting. Mold release agents that are useful in the present invention include silanes, for example Repcon rain repellant, available from Unelko Corporation (Chicago, Ill.).

EXAMPLES

In the following examples, all parts are by equivalent weight or weight percent unless otherwise indicated. These examples are illustrative and representative of the various embodiments of the present invention described above.

The materials used in the following examples were obtained from the following commercial sources:

| | |
|---|---|
| 4,4'-methylenebis(cyclohexyl isocyanate) | Miles Industrial Chemicals |
| polyester glycols prepared from 1,6-hexanediol and adipic acid | RUCO Polymer Corporation |
| 4,4'-methylenebis(3-chloro-2,6-diethylaniline) | Air Products and Chemicals, Inc. |
| trimethylol propane | Hoechst Celanese |
| trimethylol ethane | Aldrich |
| Irganox 1010 | Ciba Geigy |
| Cyasorb 5411 | American Cyanamid |
| Cyasorb 3604 | American Cyanamid |
| Tinuvin 328 | Ciba Geigy |
| Actipol E6 | Elf Atochem |
| Repcon | Unelko Corporation |

Example I

A polymer was prepared by adding 2,187 parts of polyester glycols prepared from 1,6-hexanediol and adipic acid (molecular weight 1,038) to 1,813 parts of 4,4'-methylenebis (cyclohexyl isocyanate) (containing approximately 50% of the trans,trans isomer) at 180–200° F. The mixture was agitated under a dry $N_2$ blanket and heated to a temperature of 275° F. over a period of approximately 60 minutes, at which time the heat source was removed. The prepolymer was cooled to 160° F. over approximately 30 minutes, and the percent NCO was determined. (The cool down time period is not a critical parameter.) Additional 4,4'-methylenebis(cyclohexyl isocyanate) was added to achieve an equivalent weight of 420. The prepolymer was then reacted with 4,4'-methylenebis(3-chloro-2,6-diethylaniline) in an equivalent ratio of 1.0 NCO to 0.98 $NH_2$ groups. The polymer was cast between glass plates so as to produce an optical sheet 0.25 inches×12 inches×12 inches, and was then cured at 250° F. for 12 hours. The glass plates were coated with Repcon rain repellent as a mold release.

The cured polyurethane sheet exhibited the following properties:

| | |
|---|---|
| Luminous transmittance | 85% |
| Haze | 3.5% |
| Hardness Shore "D" | 80–81 |
| Heat Distortion at 264 psi | 302° F. |
| V-50, 0.22 cal FSP | 1180 ft./sec. |

The luminous transmittance and haze were measured using a Gardner Laboratory XL 230 calorimeter.

Example II

To the prepolymer prepared according to Example I, 1.5% Cyasorb 5411 and 0.2% Irganox 1010 were added, based upon the prepolymer weight. Prior to casting the prepolymer, 0.25% Cyasorb 3604 was added based upon the total weight of the reactants (including the weight of the curing agent). The mixture was then cast and cured as described in Example I. The cured polyurethane sheet exhibited the following properties:

| | |
|---|---|
| Luminous transmittance | 85% |
| Haze | 3.5% |

-continued

| | |
|---|---|
| Hardness Shore "D" | 80–81 |
| V-50 0.22 cal FSP | 1192 ft./sec. |
| 1000 hour accelerated ultraviolet exposure | No change in the above properties |
| 2000 hour accelerated ultraviolet exposure | No change in the above properties |
| 6 month outdoor weathering (Phoenix, AZ) | Virtually no change in the above properties |

The luminous transmittance and the haze were measured as in Example I. The ballistic properties of the polyurethane material were not affected by either the accelerated ultraviolet exposure or the outdoor weathering.

Example III

To the prepolymer prepared according to Example II, trimethylol propane ("TMP") was added so as to produce one percent cross-linking based upon equivalents of reactants. A 0.25×12×12 inch test sheet was cast, as in Example I. The cured polyurethane sheet exhibited the following properties:

| | |
|---|---|
| Luminous transmittance | 85% |
| Haze | 3.5% |
| Hardness Shore "D" | 80–81 |
| Heat distortion at 264 psi | 320° F. |
| V-50 0.22 cal FSP | 1224 ft./sec. |
| Craze resistance to isopropyl alcohol | >7,000 |

The luminous transmittance and the haze were measured as in Example I. The addition of TMP to the prepolymer improved both the heat distortion temperature and V-50 test as compared with Examples I and II. The V-50 test result shows a 34% improvement over polycarbonate, and the heat distortion temperature is 45° F. higher than the heat distortion temperature of polycarbonate.

Example IV

To the prepolymer prepared according to Example II, 2.0 to 2.5 percent by weight Actipol E6 was added. The addition of the Actipol E6 further improved the impact and crack propagation resistance of the cured polyurethane sheet.

The foregoing disclosure of examples and other embodiments of the present invention has been presented for purposes of illustration and description. It is not intended to be exhaustive or to limit the invention to the precise examples and embodiments disclosed. Many variations and modifications and modifications of the examples and embodiments described herein will be obvious to one of ordinary skill in the art in light of the above disclosure. The scope of the invention is to be defined only by the claims appended hereto, and by their equivalents.

What is claimed is:

1. A polyurethane material comprising the reaction product of:

(a) a polyurethane prepolymer prepared by reaction of methylenebis(cyclohexyl isocyanate) with an OH-containing intermediate having a weight average molecular weight between about 500 and about 1,200 selected from the group consisting of polyester glycols, polyether glycols, and mixtures thereof in an equivalent ratio of 2.5 to 4.5 NCO/1.0 OH; and (b) an aromatic diamine curing agent having the formula:

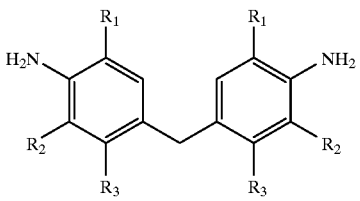

wherein $R_1$ and $R_2$ are each independently selected from the group consisting of methyl, ethyl, propyl and isopropyl groups, and $R_3$ is chlorine, in an equivalent ratio of 0.95 to 1.02 $NH_2/1.0$ NCO.

2. The polyurethane material of claim 1, wherein the diamine curing agent is 4,4'-methylenebis(3-chloro-2,6-diethylaniline).

3. The polyurethane material of claim 1, wherein the polyurethane material has a heat distortion temperature in the range of 210° F. to 325° F. at 264 psi.

4. The polyurethane material of claim 1, wherein the polyurethane material has a heat distortion temperature of at least 300° F. at 264 psi.

5. The polyurethane material of claim 1, wherein the polyurethane material has a heat distortion temperature of at least 250° F. at 264 psi.

6. The polyurethane material of claim 1, wherein the polyurethane material is optically clear such that a 0.25 inch thick sheet has a luminous transmittance of at least 85%.

7. The polyurethane material of claim 1, wherein a 0.25-inch thick sheet of the polyurethane material has a V-50 0.22 cal FSP rating of at least 1,100 feet/second.

8. The polyurethane material of claim 1, wherein the methylenebis(cyclohexyl isocyanate) is reacted with the OH-containing intermediate in an equivalent ratio of 3 to 3.5 NCO/1.0 OH.

9. The polyurethane material of claim 1, wherein diamine curing agent is reacted with the prepolymer in an equivalent ratio of 0.96 to 1.0 $NH_2/1.0$ NCO.

10. The polyurethane material of claim 1, wherein the weight average molecular weight of the OH-containing intermediate is between about 600 and about 900.

11. The polyurethane material of claim 1, wherein the OH-containing intermediate comprises at least one polyester glycol.

12. The polyurethane material of claim 11, wherein the polyester glycol is selected from the group consisting of polyester glycols prepared from 1,6-hexanediol and adipic acid, polyester glycols prepared from 1,10-decanediol and adipic acid, and polyester glycols prepared from 1,10-decanediol and caprolactone, and mixtures thereof.

13. The polyurethane material of claim 1, wherein the methylenebis(cyclohexyl isocyanate) comprises 20 to 100 percent of the trans,trans isomer of 4,4'-methylenebis(cyclohexyl isocyanate).

14. The polyurethane material of claim 1, wherein the methylenebis(cyclohexyl isocyanate) comprises at least 50 percent of the trans,trans isomer of 4,4'-methylenebis(cyclohexyl isocyanate).

15. The polyurethane material of claim 1, wherein the prepolymer further comprises an activated polybutene with an epoxide functionality on one end.

16. The polyurethane material of claim 15, wherein the activated polybutene has the following chemical formula:

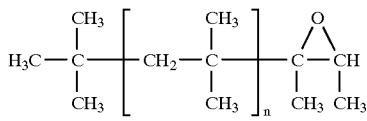

where n has a range of values such that the weight average molecular weight is about 365.

17. The polyurethane material of claim 1, wherein the prepolymer further comprises a UV-stabilizer.

18. The polyurethane material of claim 17, wherein the UV-stabilizer is selected from the group consisting of a compound having the following chemical formula:

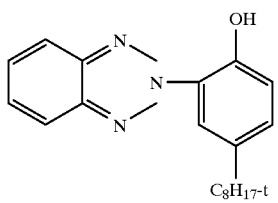

a compound having the following chemical formula:

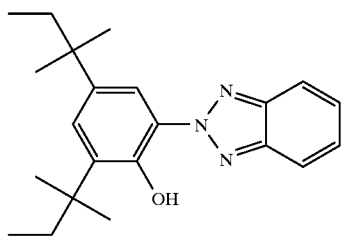

and a compound having the following chemical formula:

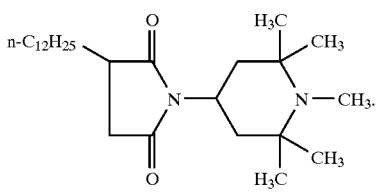

19. The polyurethane material of claim 1, wherein the prepolymer further comprises an anti-oxidant.

20. The polyurethane material of claim 19, wherein the anti-oxidant has the following chemical formula:

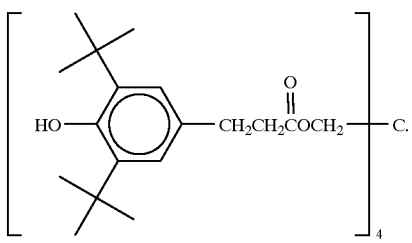

21. The polyurethane material of claim 1, wherein the polyurethane material has excellent outdoor weathering characteristics.

22. The polyurethane material of claim 1, wherein the polyurethane material has excellent solvent resistance.

23. The polyurethane material of claim 1, wherein the prepolymer further comprises a triol in an amount sufficient to produce 1% cross-linking based upon equivalents of reactants.

24. The polyurethane material of claim 23, wherein the triol is selected from the group consisting of trimethylol ethane, trimethylol propane, and mixtures thereof.

25. The polyurethane material of claim 1, wherein the polyurethane material is optically clear such that a 0.25 inch thick sheet has haze not greater than 3.5%.

26. The polyurethane material of claim 1, wherein the polyurethane material has a Shore D hardness of at least 80.

27. A method for preparing polyurethane comprising the steps of:
 (a) reacting methylenebis(cyclohexyl isocyanate) with an OH-containing intermediate having a weight average molecular weight between about 500 and about 1,200 selected from the group consisting of polyester glycols, polyether glycols, and mixtures thereof in an equivalent ratio of 2.5 to 4.5 NCO/1.0 OH to form a prepolymer; and
 (b) reacting the prepolymer with an aromatic diamine curing agent having the formula:

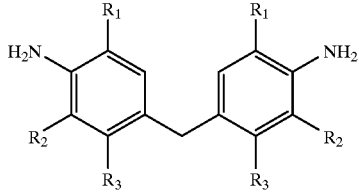

wherein $R_1$ and $R_2$ are each independently selected from the group consisting of methyl, ethyl, propyl and isopropyl groups, and $R_3$ is chlorine, in an equivalent ratio of 0.95 to 1.02 $NH_2$/1.0 NCO.

28. The method of claim 27, wherein the diamine curing agent is 4,4'-methylenebis(3-chloro-2,6-diethylaniline).

29. The method of claim 27, wherein the methylenebis (cyclohexyl isocyanate) is reacted with the OH-containing intermediate in an equivalent ratio of 3 to 3.5 NCO/1.0 OH.

30. The method of claim 27, wherein the diamine curing agent is reacted with the prepolymer in an equivalent ratio of 0.96 to 1.0 $NH_2$/1.0 NCO.

31. The method of claim 27, wherein the weight average molecular weight of the OH-containing intermediate is between about 600 and about 900.

32. The method of claim 27, wherein the OH-containing intermediate comprises at least one polyester glycol.

33. The method of claim 32, wherein the polyester glycol is selected from the group consisting of polyester glycols prepared from 1,6-hexanediol and adipic acid, polyester glycols prepared from 1,10-decanediol and adipic acid, and polyester glycols prepared from 1,10-decanediol and caprolactone, and mixtures thereof.

34. The method of claim 27, wherein the methylenebis (cyclohexyl isocyanate) comprises 20 to 100 percent of the trans,trans isomer of 4,4'-methylenebis(cyclohexyl isocyanate).

35. The method of claim 27, wherein the methylenebis (cyclohexyl isocyanate) comprises at least 50 percent of the trans,trans isomer of 4,4'-methylenebis(cyclohexyl isocyanate).

36. The method of claim 27, wherein an activated polybutene polymer with an epoxide functionality on one end is added to the prepolymer.

37. The method of claim 27, wherein a UV-stabilizer is added to the prepolymer.

38. The method of claim 37, wherein the UV-stabilizer is selected from the group consisting of a compound having the following chemical formula:

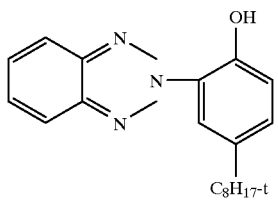

a compound having the following chemical formula:

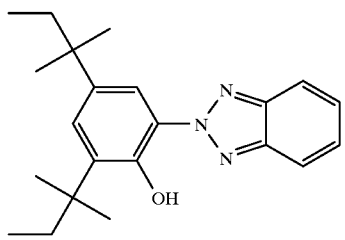

and a compound having the following chemical formula:

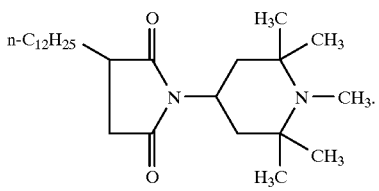

39. The method of claim 27, wherein an anti-oxidant is added to the prepolymer.

40. The method of claim 39, wherein the anti-oxidant has the following chemical formula:

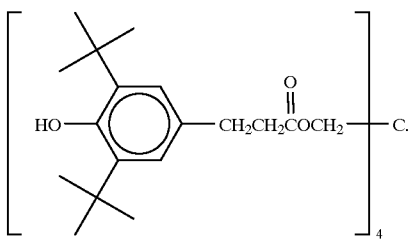

41. The method of claim 27, further comprising adding a quantity of triol sufficient to produce 1% cross-linking based upon equivalents of reactants.

42. The method of claim 41, wherein the triol is selected from the group consisting of trimethylol ethane, trimethylol propane, and mixtures thereof.

43. A polyurethane material comprising the reaction product of:
   (a) a polyurethane prepolymer prepared by reaction of 4,4'-methylenebis (cyclohexyl isocyanate) with a polyester glycol having a weight average molecular weight between about 600 and about 900 selected from the group consisting of polyester glycols prepared from 1,6-hexanediol and adipic acid, polyester glycols prepared from 1,10-decanediol and adipic acid, polyester glycols prepared from 1,10-decanediol and caprolactone, and mixtures thereof in an equivalent ratio of 2.5 to 4.5 NCO/1.0 OH; and
   (b) 4,4'-methylenebis (3-chloro-2,6-diethylaniline) as a curing agent in an equivalent ratio of 0.95 to 1.02 $NH_2/1.0$ NCO,
   wherein the polyurethane material has a heat distortion temperature of a least 300° F. at 264 psi.

44. A method for preparing polyurethane comprising the steps of:
   (a) mixing 4,4'-methylenebis(cyclohexyl isocyanate) with an OH-containing intermediate having a weight average molecular weight of between about 500 and about 1,200 selected from the group consisting of polyester glycols, polyether glycols, and mixtures thereof in an equivalent ratio of 2.5 to 4.5 NCO/1.0 OH at about 180–200° F. to produce a mixture;
   (b) heating the mixture with a heat source under dry nitrogen to about 190–275° F. so that said 4,4'-methylenebis(cyclohexyl isocyanate) reacts with said OH-containing intermediate to produce a prepolymer;
   (c) removing the heat source and cooling the prepolymer to below 160° F.;
   (d) determining the percent of NCO in the prepolymer:
   (e) adding 4,4'-methylenebis(cyclohexyl isocyanate) to the prepolymer so that the equivalent weight of the prepolymer is 415–425;
   (f) adding 4,4'-methylenebis(3-chloro-2,6-diethylaniline) at an equivalent ratio of 0.95 to 1.02 $NH_2/1.0$ NCO; and
   (g) curing the polyurethane at 240–275° F.

45. The method of claim 44, wherein, in step (a), said 4,4'-methylenebis(cyclohexyl isocyanate) is mixed with the OH-containing intermediate in an equivalent ratio of 0.96 to 1.0 $NH_2/1.0$ NCO.

46. The method of claim 44, wherein the temperature to which the mixture is heated in step (b) is 260–275° F.

47. The method of claim 44, further comprising the step of casting the polyurethane prior to curing the polyurethane.

48. The method of claim 44, wherein the 4,4'-methylenebis(cyclohexyl isocyanate) comprises at least 50% of the trans,trans isomer, and no more than about 20% of the cis,cis isomer.

49. The method of claim 44, further comprising the step of adding an activated polybutene with epoxide functionality at one end to the prepolymer after step (e).

50. The method of claim 49, wherein the activated polybutene has the following chemical formula:

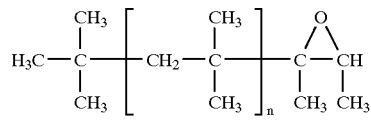

where n has a range of values such that the weight average molecular weight is about 365.

51. The method of claim 50, wherein about 2 to 2.5% by weight of the activated polybutene is added to the prepolymer.

52. The method of claim 44, further comprising the step of adding a UV-stabilizer to the prepolymer in an amount of about 1.5–2.0% by weight of the prepolymer.

53. The method of claim 52, wherein the UV-stabilizer is selected from the group consisting of a compound having the following chemical formula:

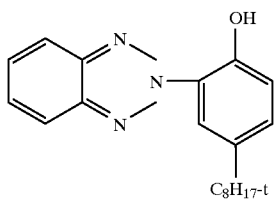

a compound having the following chemical formula:

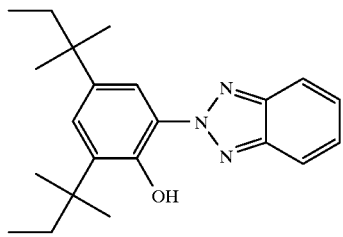

and a compound having the following chemical formula:

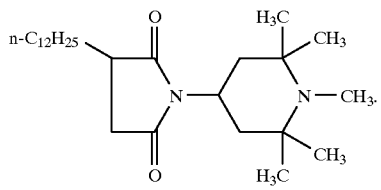

54. The method of claim 44, further comprising the step of adding an anti-oxidant to the prepolymer.

55. The method of claim 54, wherein the anti-oxidant has the following chemical formula:

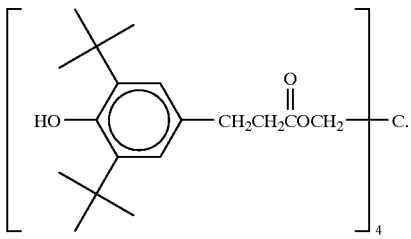

56. The method of claim 44, further comprising adding a quantity of triol sufficient to produce 1% cross linking based upon equivalents of reactants.

57. The method of claim 56, wherein the triol is selected from the group consisting of trimethylol ethane, trimethylol propane, and mixtures thereof.

58. A method for preparing polyurethane comprising the steps of:
(a) reacting 4,4'-methylenebis(cyclohexyl isocyanate) with a polyester glycol having a weight average molecular weight between about 600 and about 900 selected from the group consisting of polyester glycols prepared from 1,6-hexanediol and adipic acid, polyester glycols prepared from 1,10-decanediol and adipic acid, and polyester glycols prepared from 1,10-decanediol and caprolactone, and mixtures thereof in an equivalent ratio of 2.5 to 4.5 NCO/1.0 OH; and (b) reacting the prepolymer with 4,4'-methylenebis(3-chloro-2,6-diethylaniline) as a curing agent in an equivalent ratio of 0.95 to 1.02 $NH_2/1.0$ NCO.

59. The method of claim 58, wherein said OH-containing intermediate has a weight average molecular weight of between about 600 and about 900.

60. The method of claim 58, wherein said 4,4'-methylenebis(cyclohexyl isocyanate) is mixed with said OH-containing intermediate in an equivalent ratio of 3 to 3.5 NCO/1.0 OH.

61. A polyurethane material comprising the reaction product of:
(a) a polyurethane prepolymer prepared by reaction of methylenebis(cyclohexyl isocyanate) with an OH-containing intermediate having a weight average molecular weight between about 500 and about 1,200 selected from the group consisting of polyester glycols, polyether glycols, and mixtures thereof in an equivalent ratio of 2.5 to 4.5 NCO/1.0 OH; and
(b) an aromatic diamine curing agent having the formula:

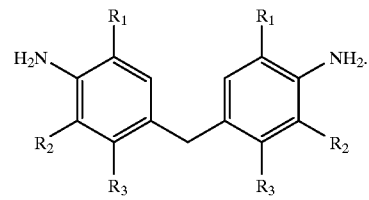

wherein $R_1$ and $R_2$ are each independently selected from the group consisting of methyl, ethyl, propyl and isopropyl groups, and $R_3$ is selected from the group consisting of hydrogen and chlorine, in an equivalent ratio of 0.95 to 1.02 $NH_2/1.0$ NCO; wherein the polyurethane material has a heat distortion temperature in the range of 210° F. to 325° F. at 264 psi.

62. The polyurethane material of claim 61, wherein $R_3$ is chlorine.

63. The polyurethane material of claim 61, wherein the diamine curing agent is 4,4'-methylenebis(3-chloro-2,6-diethylaniline).

64. The polyurethane material of claim 61 wherein the polyurethane material has a heat distortion temperature of at least 250° F. at 264 psi.

65. The polyurethane material of claim 61, wherein the polyurethane material has a heat distortion temperature of at least 300° F. at 264 psi.

66. The polyurethane material of claim 1, wherein the polyurethane material is optically clear such that a 0.25 inch thick sheet has a luminous transmittance of at least 85%.

67. The polyurethane material of claim 61, wherein a 0.25-inch thick sheet of the polyurethane material has a V-50 0.22 cal FSP rating of at least 1,100 feet/second.

68. The polyurethane material of claim 61, wherein the methylenebis(cyclohexyl isocyanate) is reacted with the OH-containing intermediate in an equivalent ratio of 3 to 3.5 NCO/1.0 OH.

69. The polyurethane material of claim 61, wherein the diamine curing agent is reacted with the prepolymer in an equivalent ratio of 0.96 to 1.0 $NH_2/1.0$ NCO.

70. The polyurethane material of claim 61, wherein the weight average molecular weight of the OH-containing intermediate is between about 600 and about 900.

71. The polyurethane material of claim 61, wherein the OH-containing intermediate comprises at least one polyester glycol selected from the group consisting of polyester glycols prepared from 1,6-hexanediol and adipic acid, polyester glycols prepared from 1,10-decanediol and adipic acid, and polyester glycols prepared from 1,10-decanediol and caprolactone, and mixtures thereof.

72. The polyurethane material of claim 61, wherein the methylenebis(cyclohexyl isocyanate) comprises 20 to 100 percent of the trans,trans isomer of 4,4'-methylenebis (cyclohexyl isocyanate).

73. The polyurethane material of claim 61, wherein the methylenebis(cyclohexyl isocyanate) comprises at least 50 percent of the trans,trans isomer of 4,4'-methylenebis (cyclohexyl isocyanate).

74. The polyurethane material of claim 61, wherein the prepolymer further comprises an activated polybutene with an epoxide functionality on one end.

75. The polyurethane material of claim 74, wherein the activated polybutene has the following chemical formula:

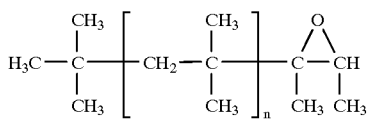

where n has a range of values such that the weight average molecular weight is about 365.

76. The polyurethane material of claim 61, wherein the prepolymer further comprises a UV-stabilizer.

77. The polyurethane material of claim 76, wherein the UV-stabilizer is selected from the group consisting of a compound having the following chemical formula:

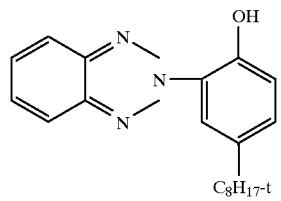

a compound having the following chemical formula:

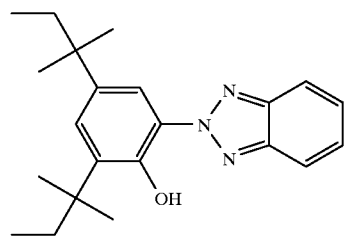

and a compound having the following chemical formula:

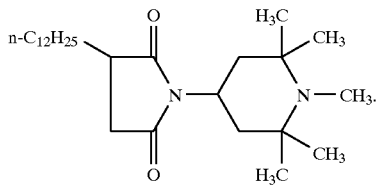

78. The polyurethane material of claim 61, wherein the prepolymer further comprises an anti-oxidant.

79. The polyurethane material of claim 78, wherein the antioxidant has the following chemical formula:

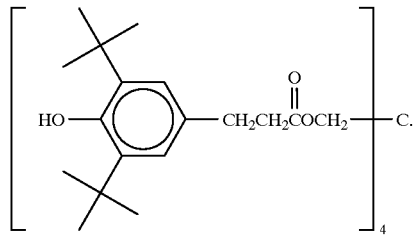

80. The polyurethane material of claim 61, wherein the polyurethane material has excellent outdoor weathering characteristics.

81. The polyurethane material of claim 61, wherein the polyurethane material has excellent solvent resistance.

82. The polyurethane material of claim 61, wherein the prepolymer further comprises a triol in an amount sufficient to produce 1% cross-linking based upon equivalents of reactants.

83. The polyurethane material of claim 82, wherein the triol is selected from the group consisting of trimethylol ethane, trimethylol propane, and mixtures thereof.

84. The polyurethane material of claim 61, wherein the polyurethane material is optically clear such that a 0.25 inch thick sheet has haze not greater than 3.5%.

85. The polyurethane material of claim 61, wherein the polyurethane material has a Shore D hardness of at least 80.

* * * * *